United States Patent
Ohashi et al.

(10) Patent No.: US 9,284,005 B2
(45) Date of Patent: Mar. 15, 2016

(54) FRONT STRUCTURE OF SADDLE-RIDE TYPE VEHICLE

(71) Applicants: Hayato Ohashi, Wako (JP); Akira Omae, Wako (JP)

(72) Inventors: Hayato Ohashi, Wako (JP); Akira Omae, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 587 days.

(21) Appl. No.: 13/654,080

(22) Filed: Oct. 17, 2012

(65) Prior Publication Data

US 2013/0100689 A1  Apr. 25, 2013

(30) Foreign Application Priority Data

Oct. 20, 2011  (JP) ................... 2011-230859

(51) Int. Cl.
| | |
|---|---|
| *B62J 6/02* | (2006.01) |
| *B62J 17/02* | (2006.01) |
| *B62J 37/00* | (2006.01) |
| *B62J 99/00* | (2009.01) |

(52) U.S. Cl.
CPC .. *B62J 6/02* (2013.01); *B62J 17/02* (2013.01); *B62J 37/00* (2013.01); *B62J 99/00* (2013.01)

(58) Field of Classification Search
CPC .............. B62J 6/02; B62J 99/00; B62J 37/00; B62J 17/02; B62J 6/00; B62J 2700/00
See application file for complete search history.

(56) References Cited

U.S. PATENT DOCUMENTS

| | | | | |
|---|---|---|---|---|
| 4,709,774 A | * | 12/1987 | Saito et al. ............... | 180/229 |
| 6,497,506 B1 | * | 12/2002 | Kakizoe ................. | 362/544 |
| 2006/0023462 A1 | * | 2/2006 | Uemoto et al. .......... | 362/475 |
| 2006/0104074 A1 | * | 5/2006 | Boniface et al. ......... | 362/496 |
| 2008/0289893 A1 | * | 11/2008 | Iwanaga ................ | 180/229 |

FOREIGN PATENT DOCUMENTS

| | | | |
|---|---|---|---|
| EP | 2106991 | * | 10/2009 |
| JP | 60-55592 U | | 4/1985 |
| JP | 61-037552 A | | 2/1986 |
| JP | 2888274 B | | 5/1999 |
| JP | 2000025672 A | * | 1/2000 |
| JP | 2001-213225 A | | 8/2001 |
| JP | 2003011719 | * | 1/2003 |
| JP | 2008-123756 A | | 5/2008 |
| JP | 2009-179202 A | | 8/2009 |
| JP | 2009-262914 A | | 11/2009 |

* cited by examiner

*Primary Examiner* — Anh Mai
*Assistant Examiner* — Fatima Farokhrooz
(74) *Attorney, Agent, or Firm* — Birch, Stewart, Kolasch & Birch, LLP

(57) ABSTRACT

A front cowl for use with a saddle-ride type vehicle includes headlights as well as an air introduction passage configured to introduce a flow of air rearwardly. The air introduction passage is opened in a forward direction to enable the headlights to be cooled by the flow of air that flow through the air introduction passage. Headlights using LEDs as their respective sources of light are placed inside an air introduction passage while supported by a duct that forms the air introduction passage.

18 Claims, 14 Drawing Sheets

FRONT STRUCTURE OF SADDLE-RIDE TYPE VEHICLE

CROSS-REFERENCE TO RELATED APPLICATIONS

The present application claims priority under 35 USC 119 to Japanese Patent Application No. 2011-230859 filed Oct. 20, 2011 the entire contents of which are hereby incorporated by reference.

BACKGROUND OF THE INVENTION

1. Field of the Invention

The present invention relates to a front structure of a saddle-ride type vehicle that includes headlights and an air introduction passage in a front portion of a vehicle body. In addition, the air introduction passage is configured to introduce a flow of air rearward and is opened in a forward direction.

2. Description of Background Art

A motorcycle is known wherein openings for lights are provided on a front cowl in a front portion of a vehicle body. A bulb headlight and a position lamp are separately arranged in inner and outer positions within each opening for lights in a vehicle widthwise direction. Multiple openings are provided on a cover for covering the opening for the lights between the headlight and the position lamp. A duct is provided for introducing a flow of air, that has been taken into the duct through each opening, toward the rear. See, for example, Japanese Patent Application Publication No. 2009-262914.

The bulb headlight secures the amount of light by means of its large size in the radial direction and in the front-rear direction. For this reason, the structure as disclosed in Japanese Patent Application Publication No. 2009-262914 provides the bulb headlight and the duct that are arranged in parallel to make it difficult to use the flow of air that flows through the air introduction passage within the duct for cooling the headlight.

SUMMARY AND OBJECTS OF THE INVENTION

The present invention has been made with the foregoing situation taken into consideration. An object of an embodiment of the present invention to provide a front structure of a saddle-ride type vehicle that enables headlights to be cooled by use of a flow of air passing through an air introduction passage.

According to an embodiment of the present invention, a front structure of a saddle-ride type vehicle is provided with headlights and an air introduction passage in a front portion of a vehicle body. The air introduction passage is opened in a forward direction and is configured to introduce a flow of air rearwardly. The headlights use LEDs as their respective sources of light and are placed inside the air introduction passage while being supported by a duct that forms the air introduction passage.

According to an embodiment of the present invention, the front structure of the saddle-ride type vehicle is configured wherein the headlights are placed inside the air introduction passage wherein passage portions are formed in at least paired two opposite sides out of paired left and right sides and paired upper and lower sides of the head lights within the duct. The passage portions are opened in a forward direction and constitute part of the air introduction passage. A flow of air flowing through the passage portions flows together behind the headlights (22, 23).

According to an embodiment of the present invention, the front structure of the saddle-ride type vehicle provides the duct that is supported by a front cowl that constitutes part of the vehicle body.

According to an embodiment of the present invention, the front structure of the saddle-ride type vehicle provides lenses in front portions of the headlights that are formed in a way that makes the lenses located further rearwardly toward the sides from the centers of the lenses, respectively.

According to an embodiment of the present invention, the front structure of the saddle-ride type vehicle provides the multiple headlights arranged side by side in a left-right direction that are placed inside the air introduction passage with a front end of the headlight, that is closer to an outside of the vehicle body in a vehicle widthwise direction, located further rearwardly than a front end of the headlight that is closer to the center of the vehicle body in the vehicle widthwise direction.

According to an embodiment of the present invention, the front structure of the saddle-ride type vehicle provides the headlights that are placed further rearwardly than points at that, in a plan view, straight lines extending in a front-rear direction while passing the centers of the headlights in the widthwise direction intersect a front end of the duct.

According to an embodiment of the present invention, the front structure of the saddle-ride type vehicle provides the headlights that are supported by the duct with the assistance of a mesh member.

According to an embodiment of the present invention, the front structure of the saddle-ride type vehicle provides the headlights that are supported with the assistance of stays that are provided in multiple portions spaced out at intervals in a circumferential direction of the duct.

According to an embodiment of the present invention, the front structure of the saddle-ride type vehicle provides a single opening, at least part of that is placed in a center portion of the vehicle body in the vehicle widthwise direction, that is provided at a front cowl constituting part of the vehicle body, and a front end of the single duct is arranged, facing the opening.

According to an embodiment of the present invention, the use of the LEDs as the sources of light makes it possible to reduce the size of the headlights, and the placement of such small headlights inside the air introduction passage in the duct makes it possible to cool the headlights with the flow of air passing through the air introduction passage. In addition, the supporting of the headlights by the duct makes specialized parts no longer necessary to support the headlights, except for the duct.

According to an embodiment of the present invention, the flow of air flowing through the passage portions, each of that is formed among the duct, either of the left and right sides of each headlight, and at least one of the upper and lower sides of the headlight, flow together behind the headlights. For this reason, a wider area of the outer surface of each headlight can be exposed to the flow of air, and the headlight can be cooled more satisfactorily.

According to an embodiment of the present invention, the headlights are not supported by the front cowl while the duct is supported by the front cowl. For this reason, the shape of the front cowl can be simplified.

According to an embodiment of the present invention, the lens of each headlight is formed in a way that makes the lens located further rearwardly toward the side from the center of the lens. For this reason, the flow of air cools the lens by hitting the lens, and easily flows from the center to the side of the lens due to the draw by the wind that flows along the inner surface of the duct at a high velocity.

According to an embodiment of the present invention, the multiple headlights are placed side by side within the air introduction passage in the left-right direction, and the front end of the headlight closer to the outside of the vehicle body in the vehicle widthwise direction is situated further rearwardly than the front end of the headlight closer to the center of the vehicle body in the vehicle widthwise direction. For these reasons, the velocity of the flow of air can be maintained while improving the performance of the cooling the headlights by guiding the flow of air, that flow along the lens of the headlight closer to the center of the vehicle body in the vehicle widthwise direction, to the headlight closer to the outside of the vehicle body in the vehicle widthwise direction.

According to an embodiment of the present invention, the headlights are placed further rearwardly than the points at that, in the plan view, the straight lines extending in the front-rear direction while passing the centers of the headlights in the vehicle widthwise direction intersect the front end of the duct. For this reason, it is possible to prevent the lenses in the front portions of the headlights by preventing foreign objects from coming into contact with the lenses.

According to an embodiment of the present invention, the headlights are supported by the duct with the assistance of the mesh member. For this reason, the headlights can be supported satisfactorily while allowing the flow of air to flow through the vicinity of the headlights.

According to an embodiment of the present invention, the stays are provided in the multiple portions that are spaced out at the intervals in the circumferential direction of the duct, and the headlights are supported by these stays. For this reason, the headlights can be supported satisfactorily while allowing the flow of air to flow in a wider area around each headlight.

According to an embodiment of the present invention, the single opening, at least part of that is placed in the center portion of the vehicle body in the body widthwise direction, is provided on the front cowl, and the front end of the single duct is arranged facing the opening. For this reason, the shape of the front cowl can be simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the accompanying drawings, descriptions will be provided for embodiments of the present invention. It should be noted that the front or frontward, rearward, upward, downward, leftward and rightward in the following descriptions respectively mean the directions from a rider riding a motorcycle.

Figure 1:
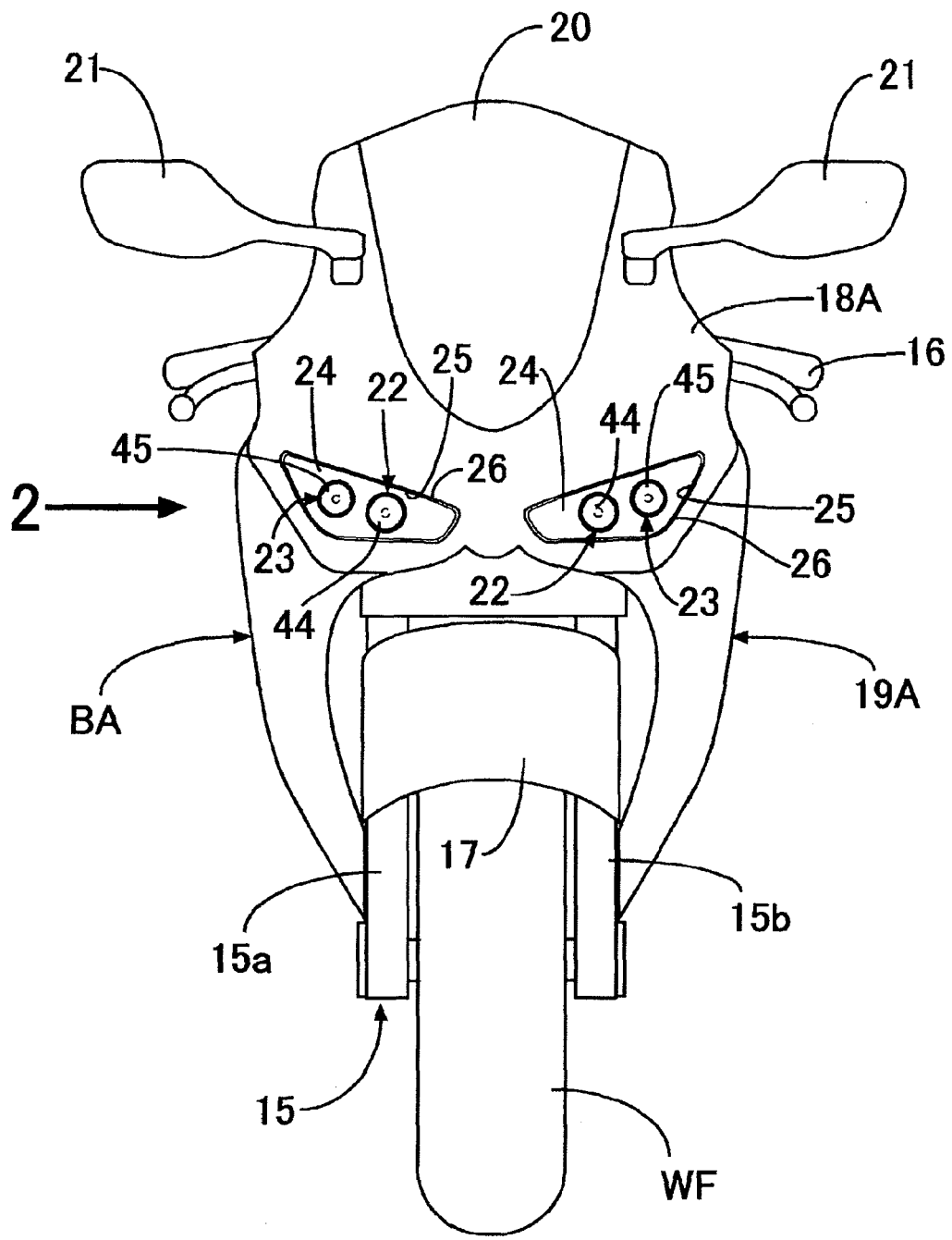
FIG. 1 is a front view of a motorcycle of a first embodiment.

A first embodiment of the present invention will be described referring to FIGS. 1 to 4. As illustrated in FIG. 1, a front fork 15 and a steering handlebar 16 are steerably supported by a front end of a vehicle body frame of a motorcycle of a saddle-ride type vehicle. The front forks 15 includes paired left and right leg portions 15a, 15b that extend on the left and right sides of a front wheel WF with lowermost end portions pivotally support the front wheel WF, respectively. The steering handlebar 16 is connected to the uppermost portion of the front fork 15 and is shaped like a bar. A front fender 17 for covering the front wheel WF from above is supported by the two leg portions 15a, 15b of the front fork 15.

A front cowl 18A for covering the front end portion of the vehicle body frame constitutes part of a vehicle body cover 19A. Together with the vehicle body frame, the vehicle body cover 19A constitutes a vehicle body BA. A windshield screen 20 is provided in the center uppermost portion of the front cowl 18A. Rearview mirrors 21, 21 are provided at the left and right upper portions of the front cowl 18A.

Two sets of paired headlights 22, 23; 22, 23 are provided, respectively, to the left and right halves of the front portion of the vehicle body BA. In addition, paired left and right air introduction passages 24, 24 for introducing a flow of air rearwardly to an engine mounted on the vehicle body frame are provided at the front portion of the vehicle body BA in a way that opens the air introduction passages 24, 24 toward the front.

Figure 2:
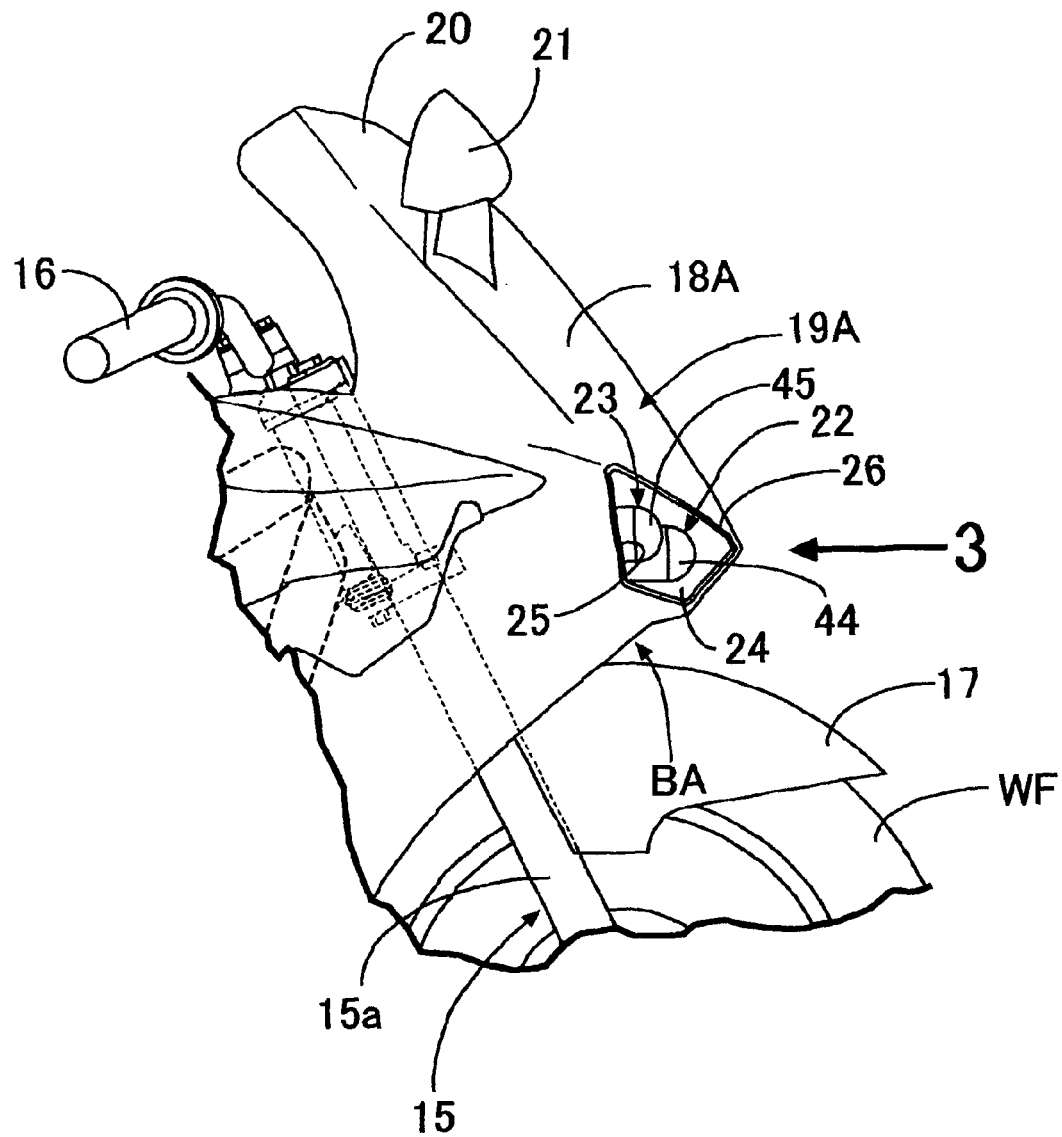
FIG. 2 is a view of the motorcycle as viewed in a direction indicated with an arrow 2 in FIG. 1.
Figure 3:
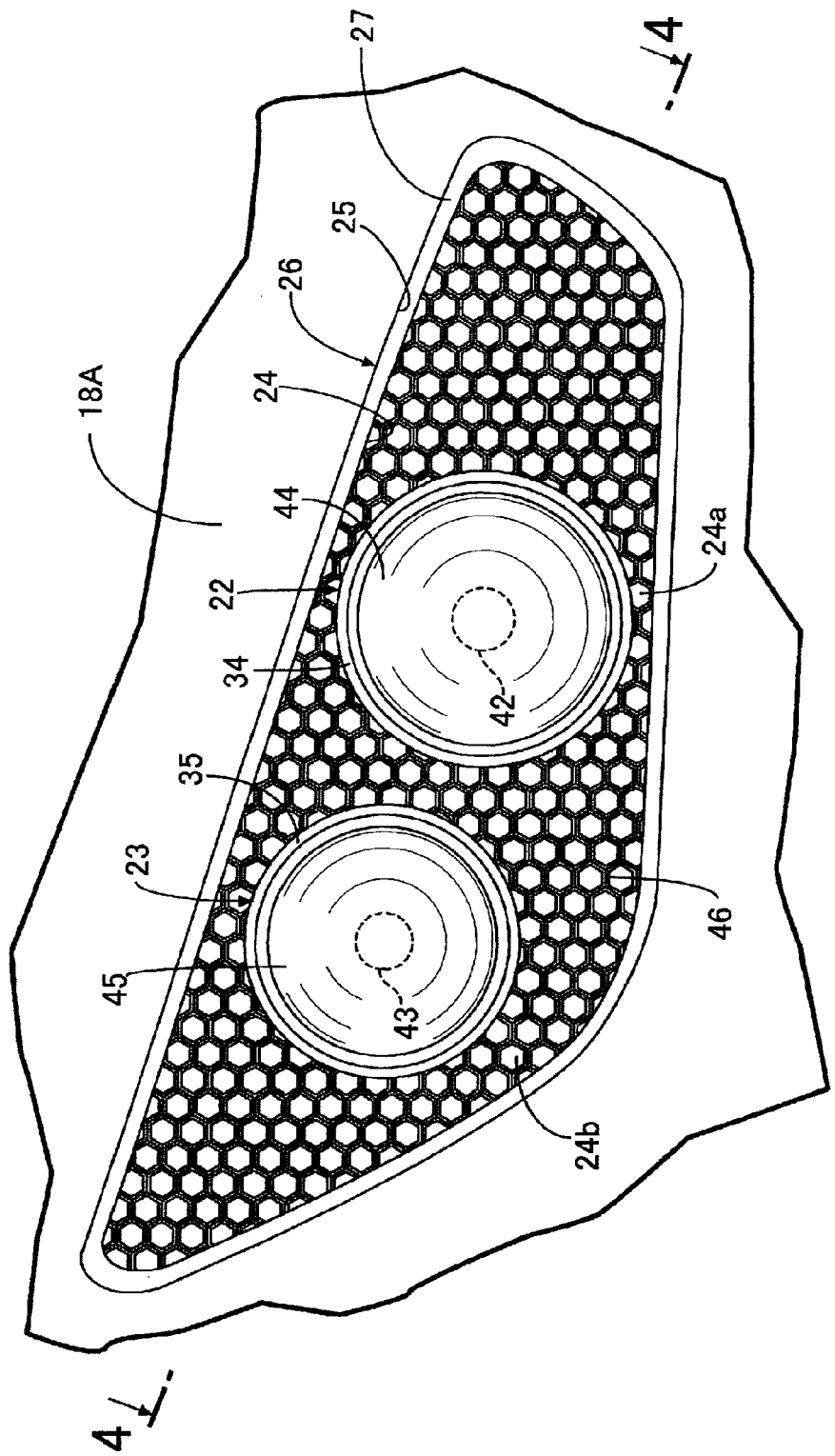
FIG. 3 is a magnified view of a main part of the motorcycle shown in FIG. 1.
Figure 4:
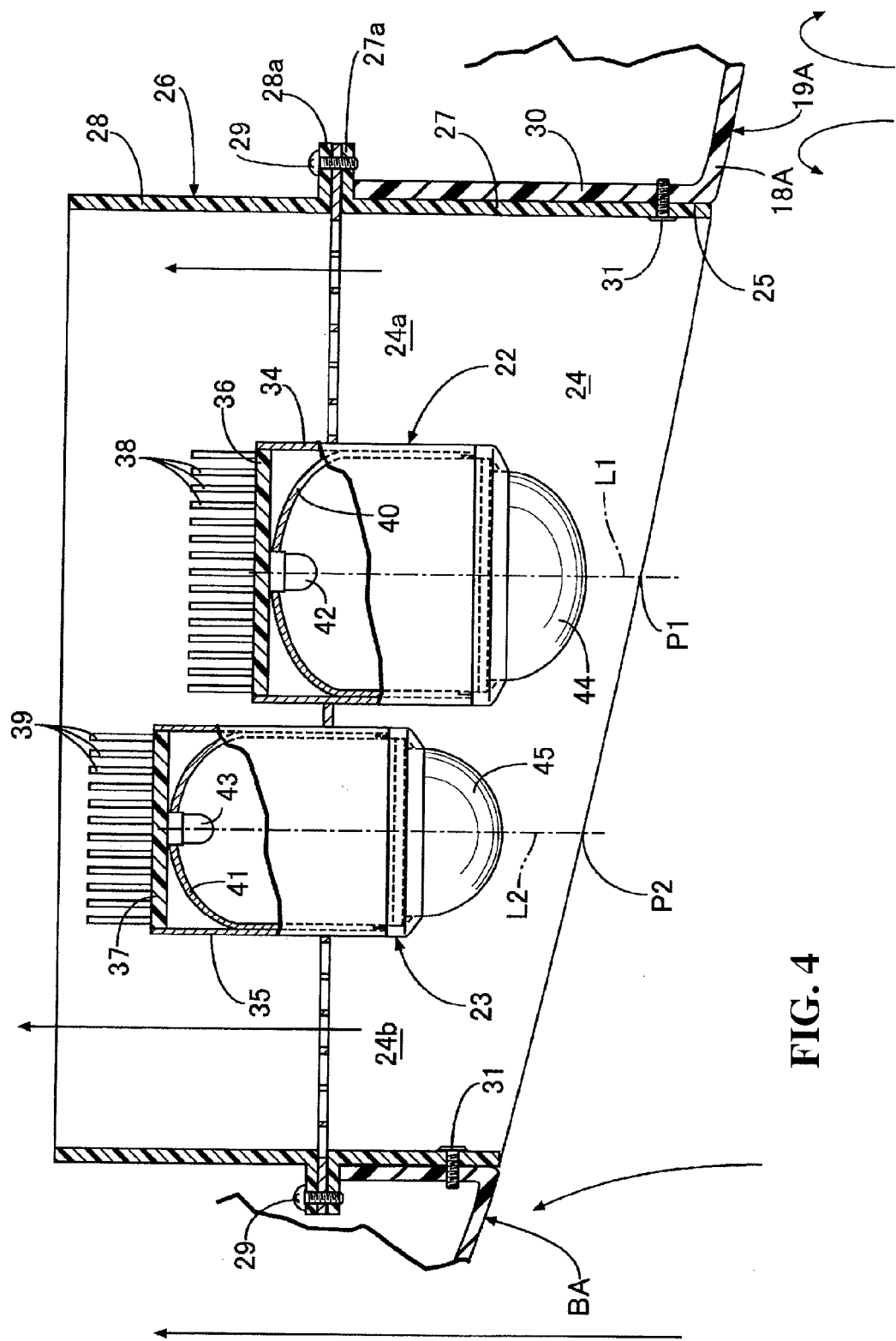
FIG. 4 is a cross-sectional view of the motorcycle taken along the 4-4 line of FIG. 3.

Referring to FIGS. 2 to 4 together, openings 25, 25 are provided, respectively, at the left and right halves of the front cowl 18A. Each opening 25 is formed in a way that becomes higher in a position toward the outside in the vehicle widthwise direction. The air introduction passages 24, 24 are formed, respectively, from ducts 26, 26 whose front ends face the openings 25, 25, and that extend rearwardly from the openings 25, 25.

As clearly shown in FIG. 4, each duct 26 includes a front duct half body 27 and a rear duct half body 28 with a front end portion joined to a rear end portion of the front duct half body 27. The joining of the front duct half body 27 and the rear duct half body 28 are achieved, for example, by fastening together a flange portion 27a provided at the rear end portion of the front duct half body 27 and a flange portion 28a provided at the front end portion of the rear duct half body 28 with multiple screw members 29, 29, . . . .

The front cowl 18A is integrally provided with a support cylindrical portion 30 that extends rearwardly while forming the corresponding opening 25. The front duct half body 27 is fitted into the support cylindrical portion 30, and is fastened to the support cylindrical portion 30 by use of screw members 31, 31, . . . . Thus, the duct 26 is supported by the front cowl 18A that constitutes part of the vehicle body BA.

The paired headlights 22, 23; 22, 23 are placed, respectively, inside the air introduction passages 24, 24 formed within the left and right ducts 26, 26 in a way that arranges each paired headlights 22, 23 side by side in the left-right direction. Each two headlights 22, 23 are designed in a way that uses LEDs 42, 43 as sources of light.

In addition, the paired headlights 22, 23 respectively include cylindrical support cases 34, 35; base plates 36, 37; reflecting mirrors 40, 41; the LEDs 42, 43; and lenses 44, 45. The axes of the respective cylindrical support cases 34, 35 are directed in the front-rear direction. The base plates 36, 37 respectively include multiple heat radiation fins 38, 38, . . . ; 39, 39 . . . that protrude rearwardly, and are attached to the rear end portions of the support cases 34, 35 in a way that occludes rear-end openings of the support cases 34, 35. The reflecting mirrors 40, 41 are each shaped like a bowl that is opened frontward, and are fixedly placed in the insides of the support cases 34, 35. The LEDs 42, 43 are placed on front faces of the base plates 36, 37 while placed in the center portions of the reflecting mirrors 40, 41. The lenses 44, 45 are attached to front end portions of the support cases 34, 35 in a way that occludes front-end openings of the support cases 34, 35.

The lenses 44, 45 located at the front portions of the headlights 22, 23 are projector lenses that are formed in the shape of a curve bulging forward in a way that makes the lenses 44, 45 situated further rearwardly toward the side ends from the centers.

Each of the headlights 22, 23 is placed inside the corresponding air instruction passage 24 while supported by the corresponding duct 26. In this embodiment, each of the headlights 22, 23 are supported by the duct 26 with the assistance of a mesh member 46.

A peripheral portion of the mesh member 46 is held by and between the front duct half body 27 and the rear duct half body 28 that collectively constitute the duct 26. The peripheral portion of the mesh member 46 is held between the flange portion 27a of the front duct half body 27 and the flange portion 28a of the rear duct half portion 28. The support cases 34, 35 of the headlights 22, 23 are fixed to the mesh member 46 while placed penetrating the mesh member 46.

While in the state of being supported by the duct 26 with the assistance of the mesh member 46, the paired headlights 22, 23 are placed inside the air introduction passage 24 in a way that a passage portion 24a is formed among the duct 26, the left side of the headlight 22, and at least one of the upper and lower sides of the headlight 22, while a passage portion 24b is formed among the duct 26, the right side of the headlight 23, and at least one of the upper and lower sides of the headlight 23. The passage portions 24a, 24b constitute part of the air introduction passage 24, and are opened to the front. A flow of air flowing through the respective passage portions 24a, 24b flows together behind the headlights 22, 23. In the first embodiment, the passage portion 24a is formed among the duct 26, the left side of the headlight 22, and the upper and lower sides of the headlight 22, while the passage portion 24b is formed among the duct 26, the right side of the headlight 23, and the upper and lower sides of the headlight 23.

In addition, the paired headlights 22, 23 arranged side by side in the left-right direction are placed inside the air introduction passage 24 while, as shown in FIGS. 2 and 4, the front end of the headlight 23 closer to the outside in the vehicle width direction is situated further rearwardly than the front end of the headlight 22 closer to the center in the vehicle widthwise direction.

Furthermore, as shown in FIG. 4, the two headlights 22, 23 are placed further rearwardly than points P1, P2 at that, in the plan view, straight lines L1, L2 extending in the front-rear direction while passing the centers of the two headlights 22, 23 in the widthwise direction intersect the front end of the duct 26.

In FIG. 4, the flows of a flow of air around the front portion of the vehicle body BA are represented by arrows that become longer as the velocities of the flow of air increase. A flow of air flowing in the air introduction passage 24 outward of the headlight 23 in the vehicle widthwise direction is relatively fast due to a draw by a flow of air that flows along the side of the vehicle body BA, namely the side of the front cowl 18A, at a greater flow velocity. Meanwhile a flow of air flowing in the air introduction passage 24 inward of the headlight 22 in the vehicle widthwise direction is relatively slow due to the air flow stagnation that takes place as a result of the flow of air hitting the center portion of the vehicle body BA in the vehicle widthwise direction, namely the center portion of the front cowl 18A.

Next, descriptions will be provided for how the first embodiment works. The headlights 22, 23 using the LEDs 42, 43 as the sources of light are placed inside the air introduction passage 24 while supported by the duct 26 that forms the air introduction passage 24. For this reason, the use of the LEDs 42, 43 as the sources of light makes it possible to reduce the size of the headlights 22, 23. The placement of the small headlights 22, 23 inside the air introduction passage 24 within the duct 26 enables the headlights 22, 23 to be cooled with the flow of air that flows in the air introduction passage 24. Furthermore, the support of the headlights 22, 23 by the duct 26 makes specialized parts, except for the duct 26, no longer necessary for supporting the headlights 22, 23.

Moreover, the wider areas of the outer surfaces of the headlights 22, 23 can be exposed to the flow of air, and the headlights 22, 23 can therefore be cooled satisfactorily, because the headlights 22, 23 are placed inside the air introduction passage 24 in a way wherein the passage portions 24a, 24b are formed in at least paired two opposite sides (in the case of the first embodiment, both pairs) out of the paired left and right sides and the paired upper and lower sides of the headlights 22, 23, the passage portions 24a, 24b being opened to the front and constituting the part of the air introduction passage 24. The flow of air flowing through the respective passage portions 24a, 24b flows together behind the headlights 22, 23.

In addition, since the duct 26 is supported by the front cowl 18A constituting the part of the vehicle body BA, the shape of the front cowl 18A can be simplified with the headlights 22, 23 not being supported by the front cowl 18A.

Further, since the lenses 44, 45 located at the front portions of the headlights 22, 23 are formed in a way that makes the lenses 44, 45 situated further rearwardly toward the side ends from the centers, the flow of air cools the lenses 44, 45 by hitting the lenses 44, 45, and easily flows sideways from the center portions of the lenses 44, 45 due to the draw by a flow of air that flows along the inner surface of the duct 26 at a higher velocity.

Furthermore, since the paired headlights 22, 23 arranged side by side in the left-right direction are placed inside the air introduction passage 24 while the front end of the headlight 23 closer to the outside of the vehicle body in the vehicle widthwise direction is situated further rearwardly than the front end of the headlight 22 closer to the center of the vehicle body in the vehicle widthwise direction, the flow velocity of the flow of air can be maintained while improving the performance of the cooling of the headlights 22, 23 by guiding a flow of air, that flows along the lens 44 of the headlight 22 closer to the center of the vehicle body in the vehicle widthwise direction, to the headlight 23 closer to the outside of the vehicle body in the vehicle widthwise direction.

Furthermore, the headlights 22, 23 are placed further rearwardly than the points P1, P2 at that, in the plan view, the straight lines L1, L2 extending in the front-rear direction while passing the centers of the headlights 22, 23 in the widthwise direction intersect the front end of the duct 26. Thus, the lenses 44, 45 can be protected by the duct 26 by preventing foreign objects from coming into contact with the lenses 44, 45 in the front portions of the headlights 22, 23.

Moreover, since the headlights 22, 23 are supported by the duct 26 with the assistance of the mesh member 46, the headlights 22, 23 can be satisfactorily supported while allowing the flow of air to flow through the vicinity of the headlights 22, 23.

Figure 5:
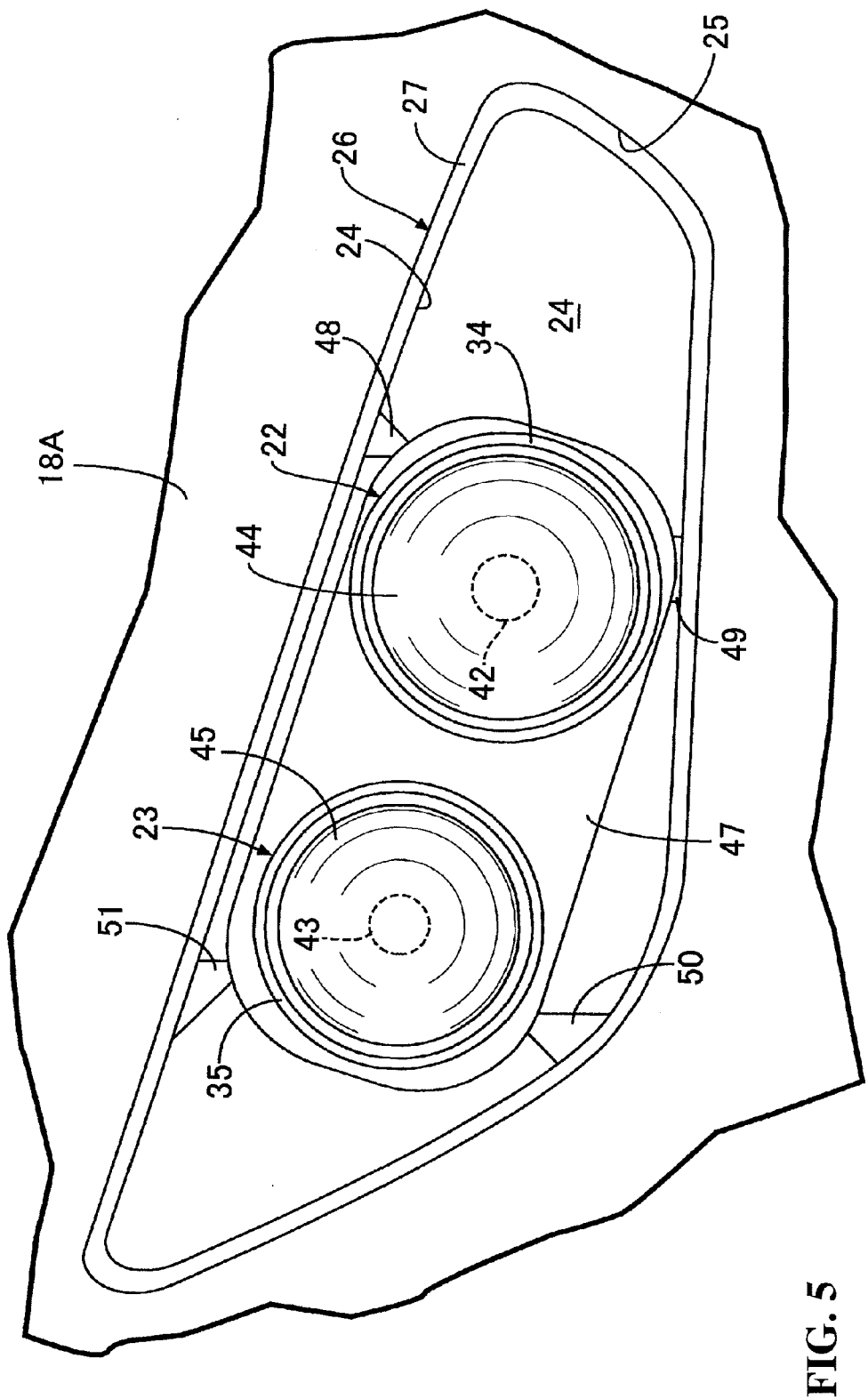
FIG. 5 is a front view of a motorcycle of a second embodiment, corresponding to FIG. 3.

Referring to FIG. 5, descriptions will be provided for a second embodiment of the present invention. Parts corresponding to those of the first embodiment shown in FIGS. 1 to 4 will simply be denoted by the same reference numerals and detailed descriptions will be omitted.

The air introduction passage 24 is formed inside the duct 26 whose front end faces the opening 25 provided in the front cowl 18A, and extends rearwardly from the opening 25. The paired headlights 22, 23 using the LED 42, 43 as the sources of light are placed inside the air introduction passage 24 in a way that arranges the headlights 22, 23 side by side in the left-right direction. The paired headlights 22, 23 are supported in common by a single support plate 47.

Stays 48, 49, 50, 51 are provided in multiple locations, for example in four positions, that are spaced out in the circumferential direction of the duct 26. The support plate 47 is fixed to the stays 48 to 51. In other words, the headlights 22, 23 are supported by the stays 48 to 51 that are provided in the four positions spaced out in the circumferential direction of the duct 26.

The second embodiment also enables the headlights 22, 23 to be satisfactorily supported while allowing a flow of air to flow in a wide area around the headlights 22, 23.

Figure 6:
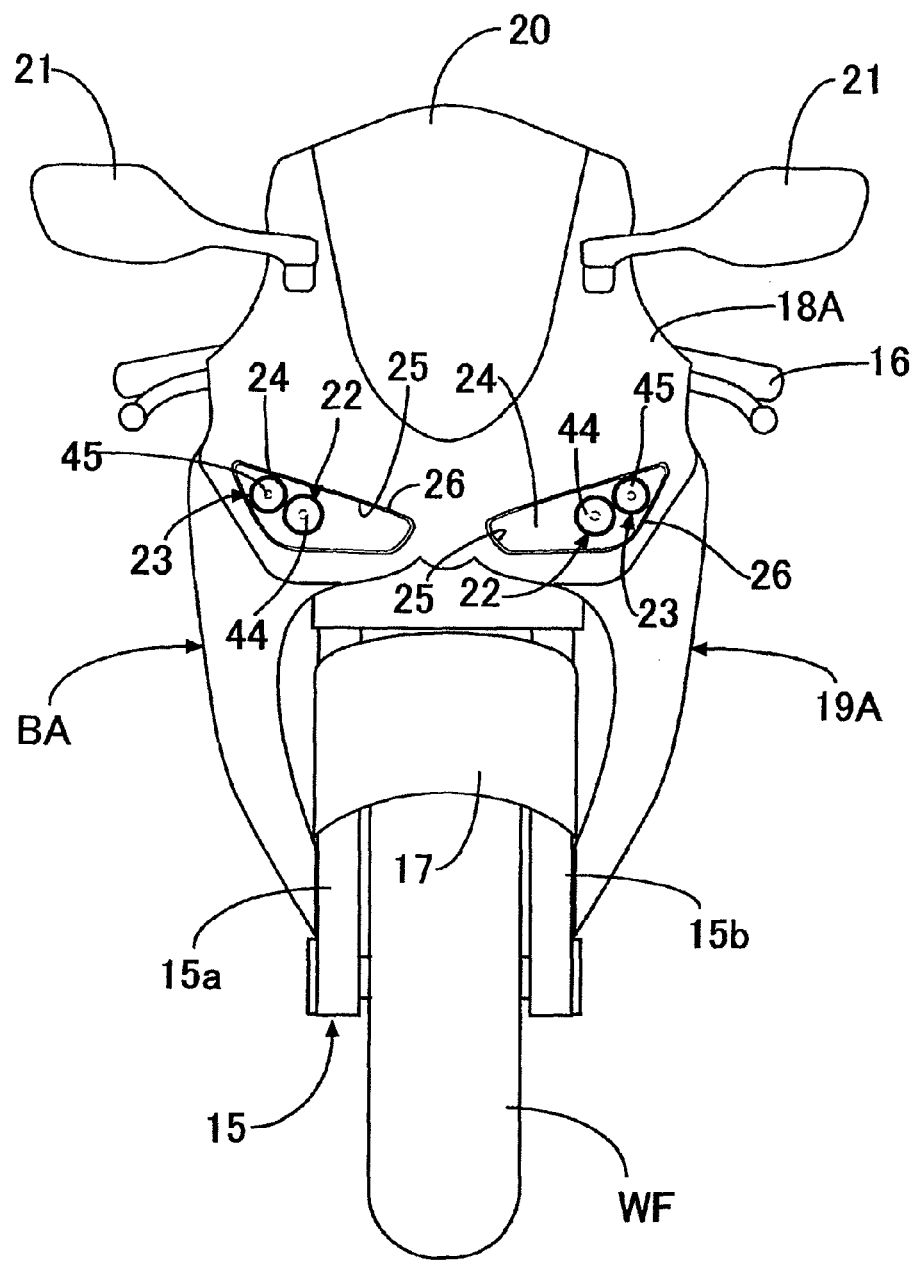
FIG. 6 is a front view of a motorcycle of a third embodiment.

As a third embodiment of the present invention, a flow of air may be designed to efficiently flow through an area within each air introduction passage 24, that is closer to the center of the vehicle body in the vehicle widthwise direction, by placing the headlights 22, 23 in a location within the air introduction passage 24, that is closer to the outside of the vehicle body in the vehicle widthwise direction, as shown in FIG. 6.

Figure 7:
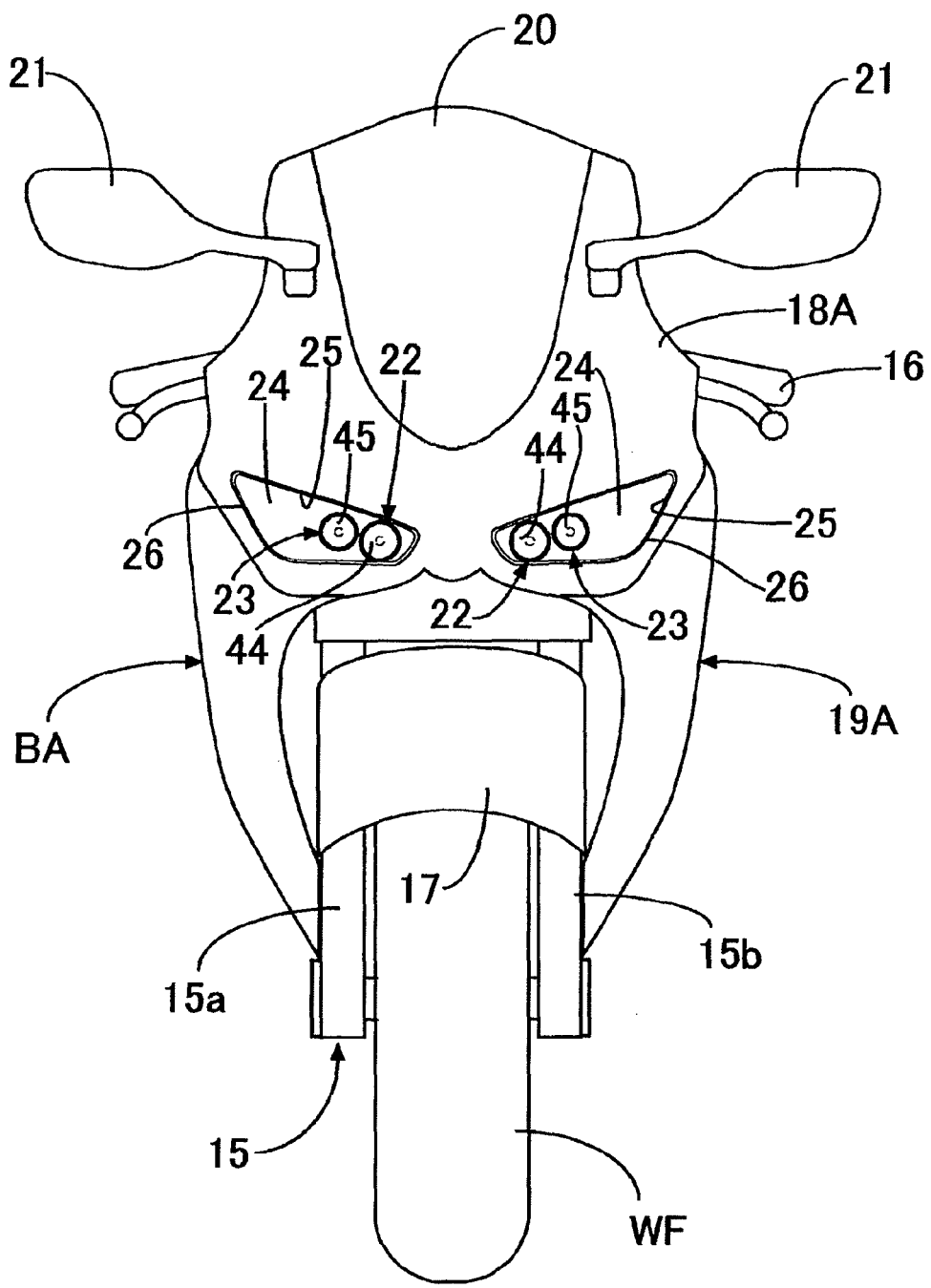
FIG. 7 is a front view of a motorcycle of a fourth embodiment.

As a fourth embodiment of the present invention, a flow of air may be designed to efficiently flow through an area within each air introduction passage 24, that is closer to the outside of the vehicle body in the vehicle widthwise direction, by placing the headlights 22, 23 in a location within the air introduction passage 24, that is closer to the center of the vehicle body in the vehicle widthwise direction, as shown in FIG. 7.

Figure 8:
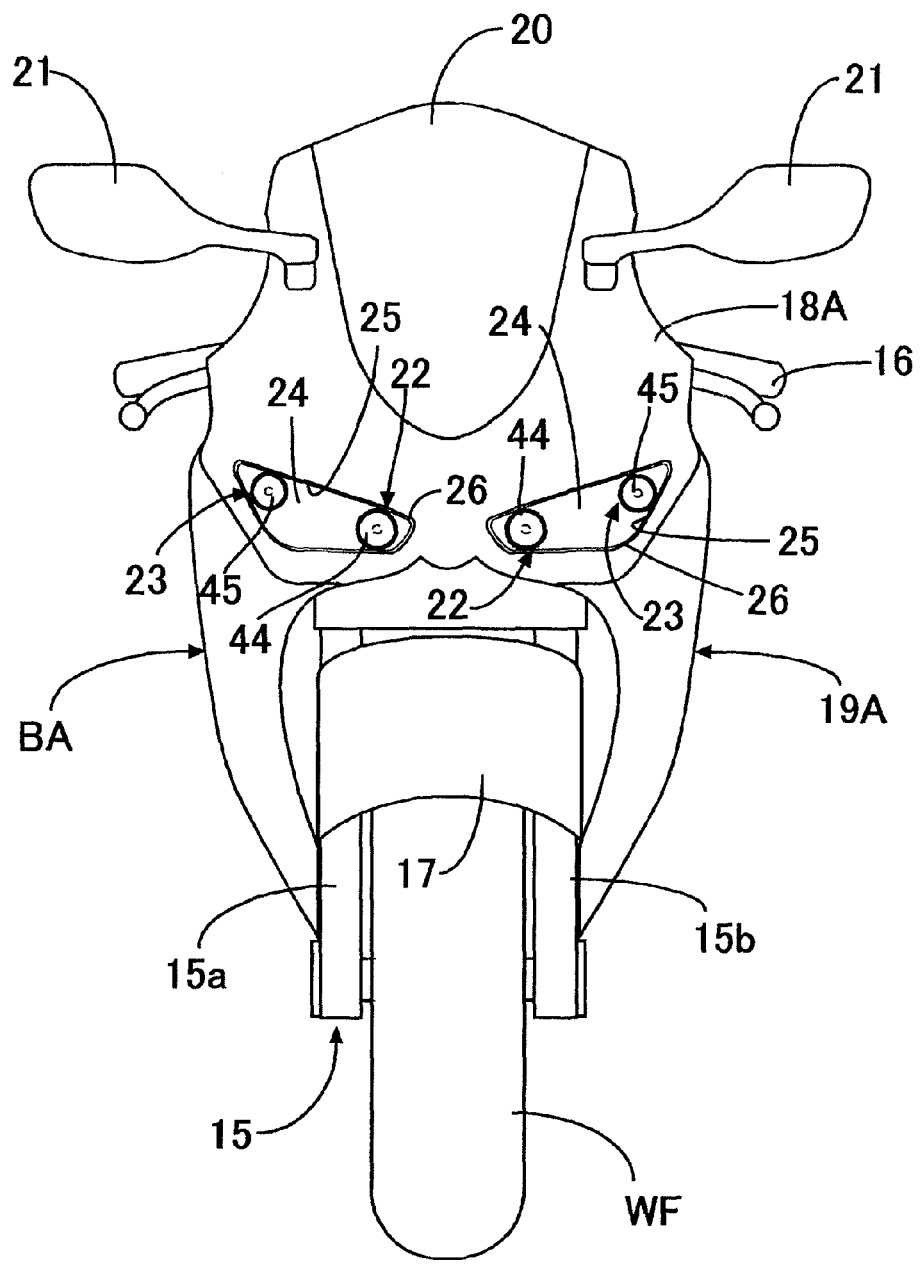
FIG. 8 is a front view of a motorcycle of a fifth embodiment.

As a fifth embodiment of the present invention, a flow of air may be designed to efficiently flow through the center portion of each air introduction passage 24 in the left-right direction, by separately placing the headlight 22 in a location within the air introduction passage 24, that is closer to the center of the vehicle body in the vehicle widthwise direction, and the headlight 23 in a location within the air introduction passage 24, that is closer to the outside of the vehicle body in the vehicle widthwise direction, as shown in FIG. 8.

Figure 9:
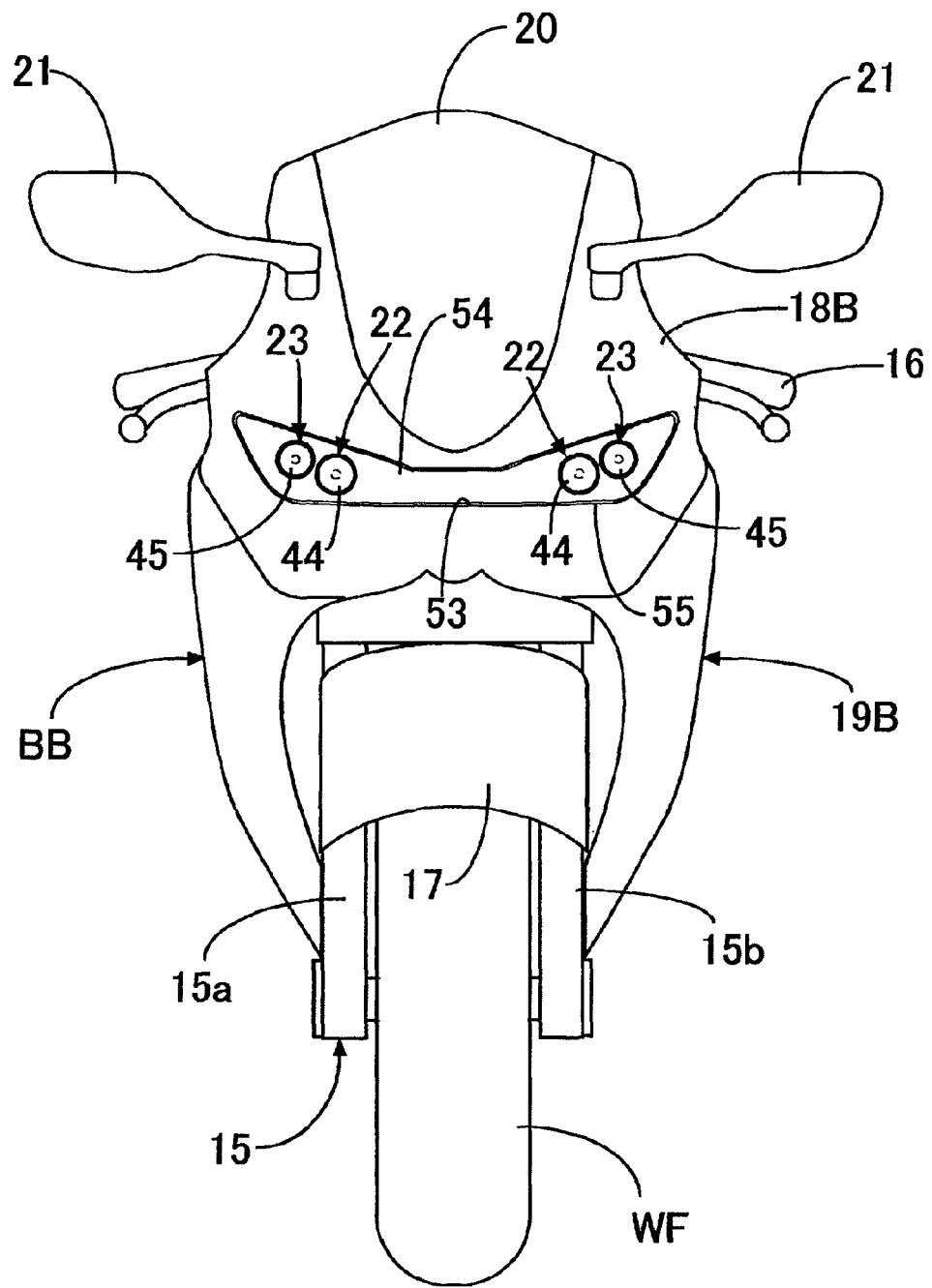
FIG. 9 is a front view of a motorcycle of a sixth embodiment.

Referring to FIG. 9, descriptions will be provided for a sixth embodiment of the present invention. Parts corresponding to those of the foregoing embodiments will simply be denoted by the same reference numerals and detailed descriptions will be omitted.

Together with the vehicle body frame, a vehicle body cover 19B, whose part is formed from a front cowl 18B, constitutes a vehicle body BB. A single opening 53, at least part of which is placed in the center portion of the vehicle body in the vehicle widthwise direction, is provided in the front cowl 18B. This opening 53 is formed, extending leftward and rightward from the center portion of the vehicle body in the vehicle widthwise direction.

An air introduction passage 54, that is configured to introduce a flow of air rearwardly and is opened to the front, is formed from a duct 55 supported by the front cowl 18B. The front end of this single duct 55 is arranged to face the opening 53.

Two sets of paired headlights 22, 23; 22, 23 are placed in the respective left and right areas within the air introduction passage 54 in a way that arranges each paired headlights 22, 23 side by side in the left-right direction. The headlights 22, 23; 22, 23 are supported by the duct 55.

The sixth embodiment makes it possible to simplify the shape of the front cowl 18B.

Figure 10:
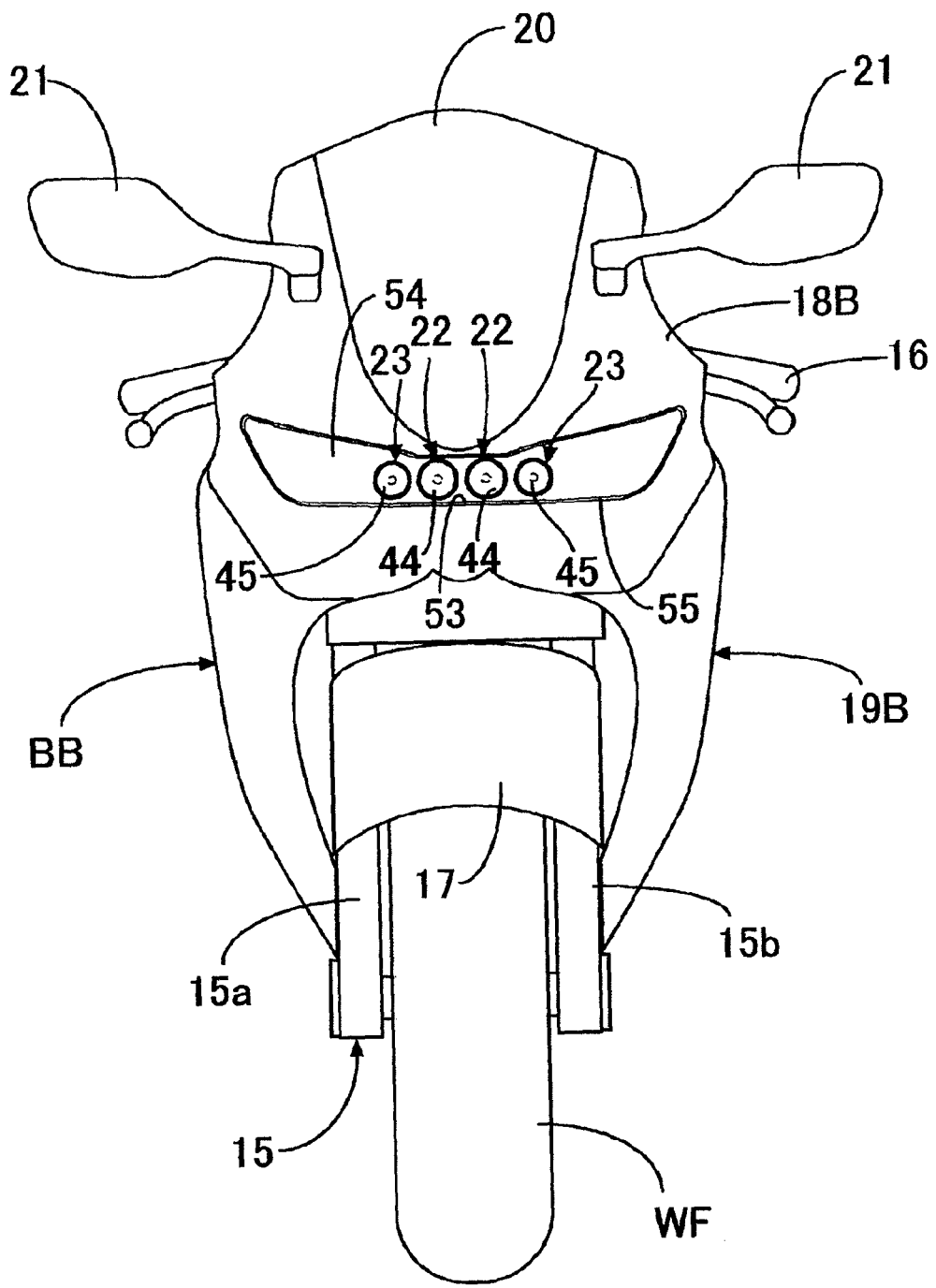
FIG. 10 is a front view of a motorcycle of a seventh embodiment.

As a seventh embodiment of the present invention, two sets of paired headlights 22, 23; 22, 23 arranged side by side in the left-right direction may be placed in the center portion of the air introduction passage 54 in the vehicle widthwise direction, as shown in FIG. 10.

Figure 11:
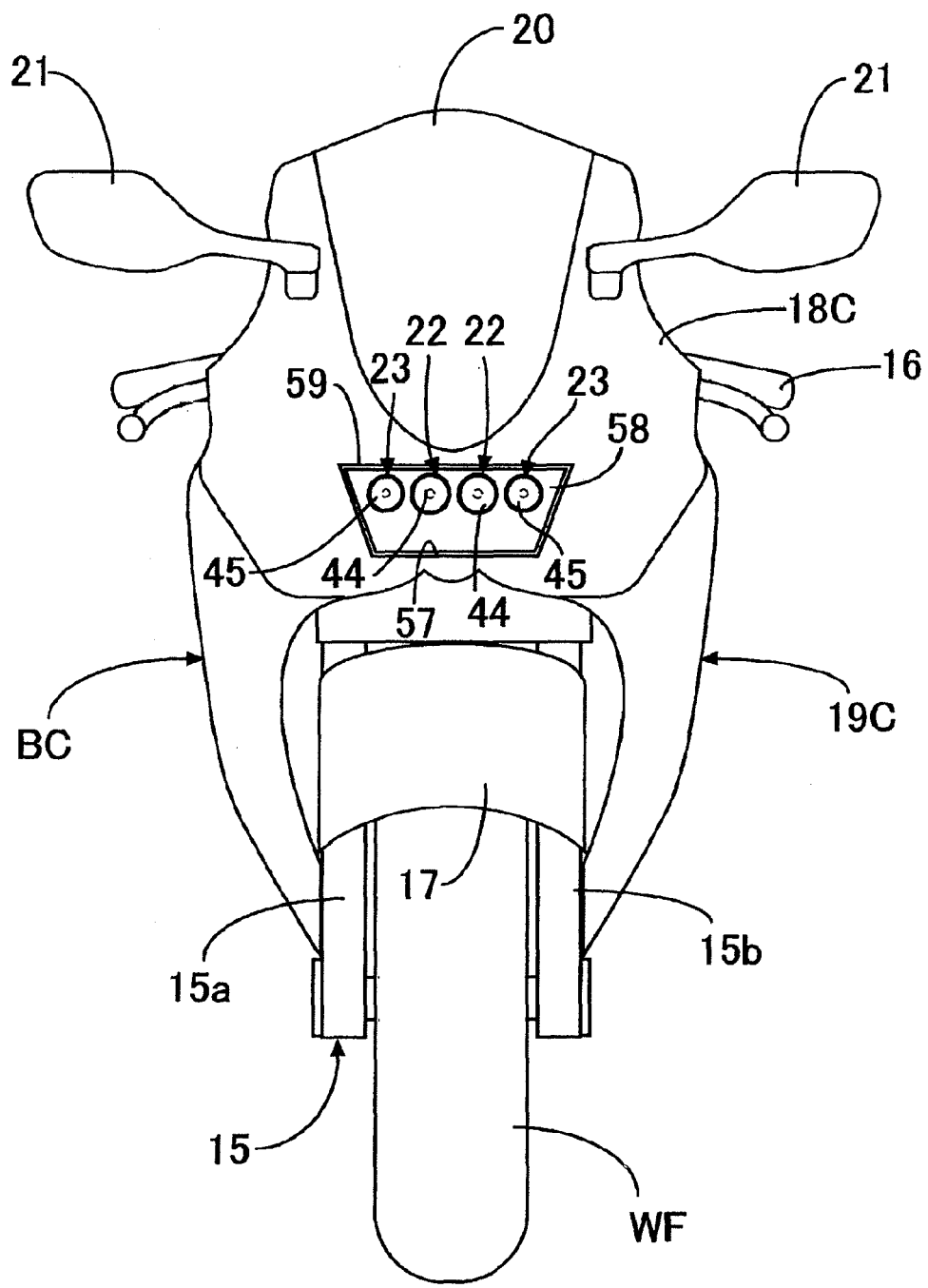
FIG. 11 is a front view of a motorcycle of an eighth embodiment.

Referring to FIG. 11, descriptions will be provided for an eighth embodiment of the present invention. Parts corresponding to those of the foregoing embodiments will simply be denoted by the same reference numerals and detailed descriptions will be omitted.

Together with the vehicle body frame, a vehicle body cover 19C, whose part is formed from a front cowl 18C, constitutes a vehicle body BC. A single opening 57, at least part of that is placed in the center portion of the vehicle body in the vehicle widthwise direction, is provided in the front cowl 18C. In the eighth embodiment, the opening 57 is placed in the center portion of the vehicle body in the vehicle widthwise direction.

An air introduction passage 58, that is configured to introduce a flow of air rearwardly and is opened to the front, is formed from a duct 59 supported by the front cowl 18C. The front end of this single duct 59 is arranged, facing the opening 57.

Two sets of paired headlights 22, 23; 22, 23 are placed in the upper area within the air introduction passage 58 in a way that arranges each paired headlights 22, 23 side by side in the left-right direction. The headlights 22, 23; 22, 23 are supported by the duct 59.

The eighth embodiment can bring about the same effects as the sixth and seventh embodiments.

As a modification of the eighth embodiment, the two sets of paired headlights 22, 23; 22, 23 may be placed in the lower area within the air introduction passage 58 in a way that arranges each paired headlights 22, 23 side by side in the left-right direction.

Figure 12:
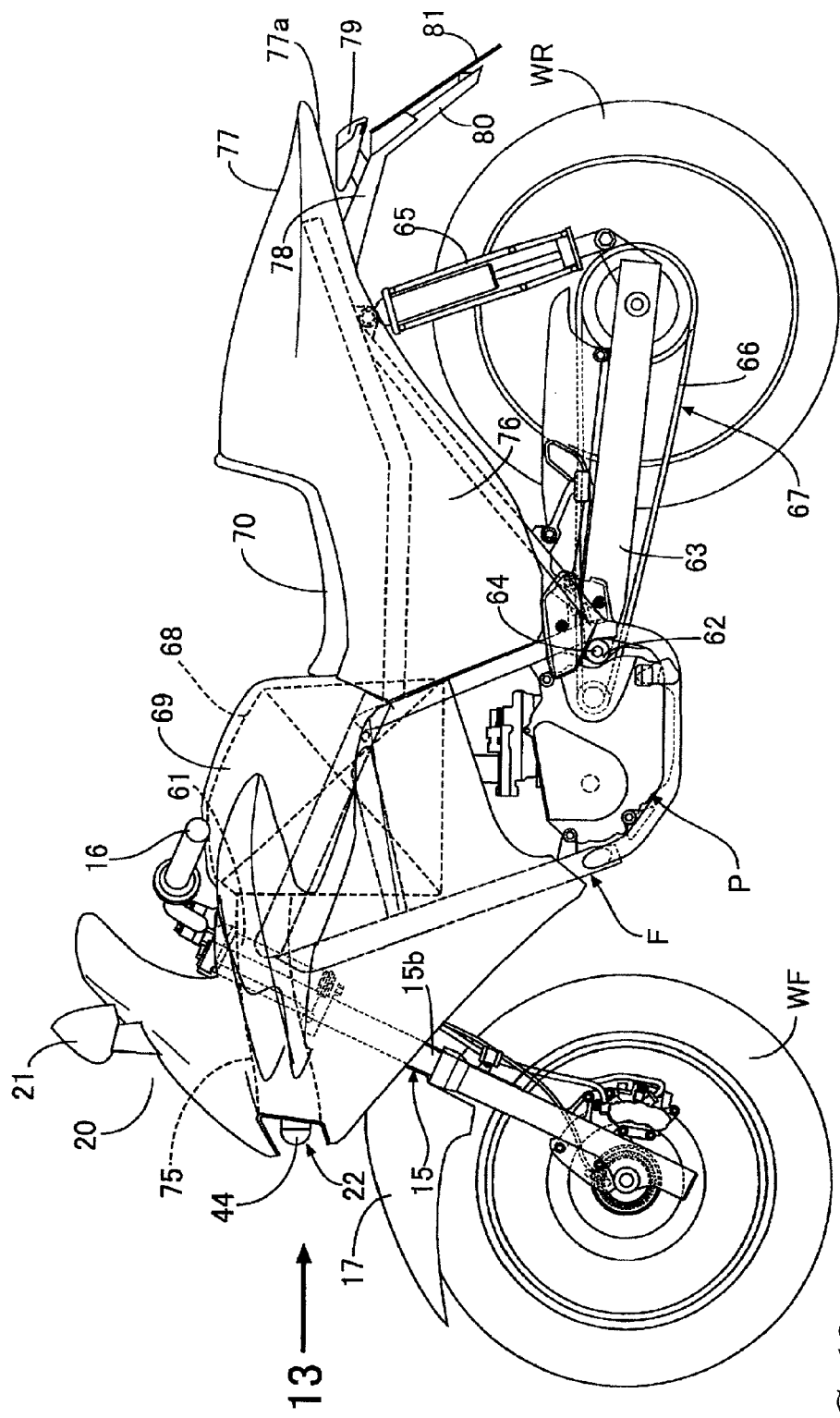
FIG. 12 is a side view of a motorcycle of a ninth embodiment.
Figure 13:
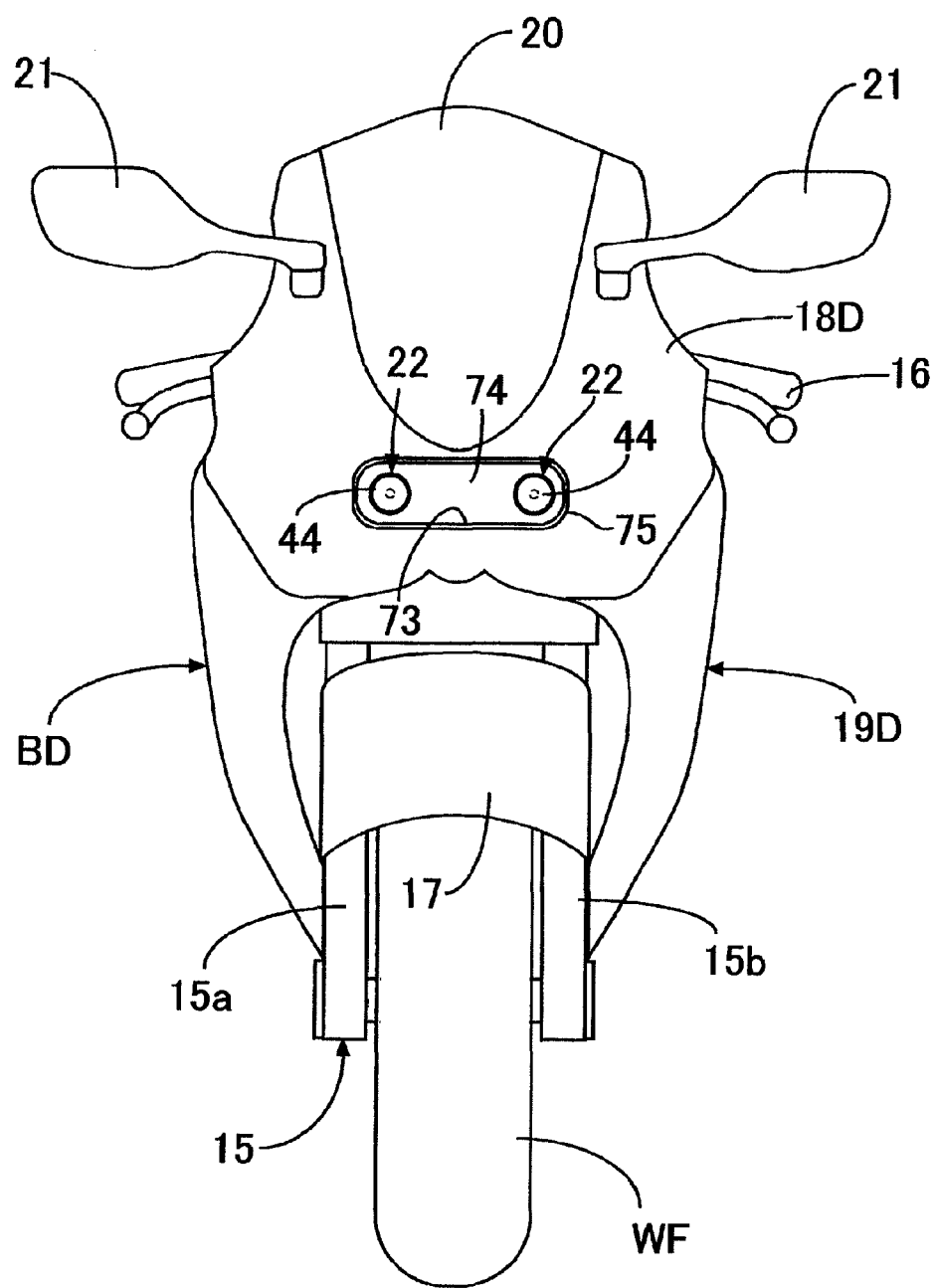
FIG. 13 is a view of the motorcycle as viewed in a direction indicated with an arrow 13 in FIG. 12.
Figure 14:
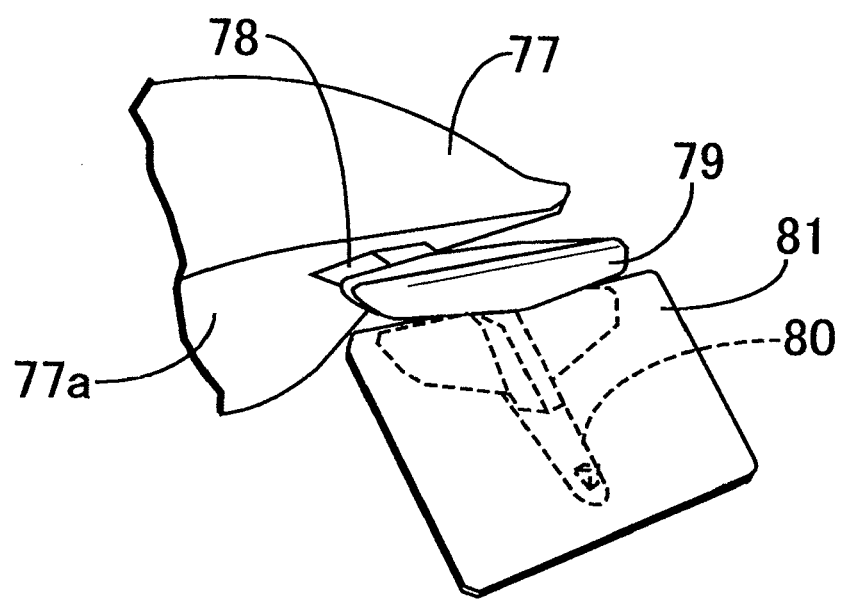
FIG. 14 is a perspective view of a rear portion of the motorcycle.

Referring to FIGS. 12 to 14, descriptions will be provided for a ninth embodiment of the present invention. Parts corresponding to those of the foregoing embodiments will simply be denoted by the same reference numerals and detailed descriptions will be omitted.

First, as shown in FIG. 12, the front fork 15 and the steering handlebar 16 are steerably supported by a head pipe 61 provided on a front end of a vehicle body frame F of an electric motorcycle as a saddle-ride type vehicle. The front end portion of a swing arm 63, whose rear end pivotally supports a rear wheel WR, is swingably supported by a bracket 62, that is provided in the lower portion of the center portion of the vehicle body frame F in the front-rear direction, with the assistance of a pivot 64. A rear shock absorber unit 65 is provided between the rear portion of the vehicle body frame F and the rear portion of the swing arm 63.

An electric power unit P is mounted on the vehicle body frame F between the front wheel WF and the rear wheel WR. The drive force from this electric power unit P is transmitted to the rear wheel WR through a chain-type transmission mechanism 67 that uses an endless chain 66.

A battery box 68, that houses a battery configured to supply electric power to the electric power unit P, is mounted on the vehicle body frame F in a way that makes the battery box 68 situated above the electric power unit P. This battery box 68 is covered with a cover 69 from above. In addition, a rider's seat 70 placed behind the battery box 68 is supported by the rear portion of the vehicle body frame F.

Referring also to FIG. 13, together with the vehicle body frame, a vehicle body cover 19D, whose part is formed from a front cowl 18D covering the front end portion of the vehicle body frame F from a forward direction, constitutes a vehicle body BD. A single opening 73, at least part of that is placed in the center portion of the vehicle body in the vehicle widthwise direction, is provided at the front cowl 18D. This opening 73 extends in the vehicle widthwise direction and is placed in the center portion of the front cowl 18D in the vehicle widthwise direction.

An air introduction passage 74, that is configured to introduce a flow of air rearwardly and is opened to the front, is formed from a duct 75 supported by the front cowl 18D. The front end of this single duct 75 is arranged, facing the opening 73. As shown in FIG. 12, the rear end of the duct 75 is connected to the battery box 68 in order to cool the battery.

Headlights 22, 22 are placed in the respective left and right areas within the air introduction passage 64. The headlights 22, 22 are supported by the duct 75.

Referring also to FIG. 14, a rear fender 77, that covers the rear wheel WR from above, is integrally continuously provided at a rear cover 76 that constitutes part of the vehicle body cover 19D, and that covers the rear portion of the vehicle body frame F. In addition, for the purpose of smoothly discharging a flow of air rearwardly, the rear fender 77 has a streamlined shape in that a lower surface 77a becomes higher toward the rear end while the vertical width of the rear fender 77 decreases toward the rear end.

A tail light 79 is placed under the rear fender 77 while supported by a stay 78 that extends rearwardly and downward from the rear fender 77. This tail light 79 uses an LED as the source of light, and is formed long in the vehicle widthwise direction. The stay 78 is continuously provided with a license plate stay 80 in a way that makes the license plate stay 80 situated under the tail light 79. A license plate 81 is fixed to the license plate stay 80.

The ninth embodiment brings about the same effects as the sixth to eighth embodiments.

Although the foregoing descriptions have been provided for the embodiments of the present invention, the present invention is not limited to the embodiments. Various changes in the design can be made without departing from the inventions described in the scope of claims.

Although, the front structure of the motorcycle, for example, has been explained in the foregoing embodiments, the present invention is applicable to three-wheeled motorcycles, and can be carried out for a wide range of saddle-ride type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front cowl for use with a saddle-ride vehicle provided with at least one headlight and an air introduction passage in a front portion of the front cowl of a vehicle body, comprising:
a duct forming said air introduction passage, said duct being opened in a forward direction and being configured to introduce a flow of air rearwardly, said duct including a front duct half body and a rear duct half body;
a mesh member having a peripheral portion positioned between the front duct half body and the rear duct half body, said mesh member extending substantially orthogonally across a width direction of the duct;
at least one support case being fixed to and penetrating the mesh member;
wherein the at least one headlight is a LED as a respective source of light, said LED being placed inside the air introduction passage while being positioned within the at least one support case.

2. The front cowl for use with the saddle-ride vehicle according to claim 1, wherein the at least one headlight is placed inside the air introduction passage wherein passage portions are formed in at least paired two opposite sides out of paired left and right sides and paired upper and lower sides of the at least one headlight within the duct, the passage portions being opened in a forward direction and constituting part of the air introduction passage; and
a flow of air flowing through the passage portions flow together behind the at least one headlight.

3. The front cowl for use with the saddle-ride vehicle according to claim 1, wherein the duct is supported by the front cowl constituting part of the vehicle body.

4. The front cowl for use with the saddle-ride vehicle according to claim 2, wherein the duct is supported by the front cowl constituting part of the vehicle body.

5. The front cowl for use with the saddle-ride vehicle according to claim 1, wherein lenses in front portions of the at least one headlight are formed wherein the lenses are located further rearwardly toward the sides from the centers of the lenses, respectively.

6. The front cowl for use with the saddle-ride vehicle according to claim 2, wherein lenses in front portions of the at least one headlight are formed wherein the lenses are located further rearwardly toward the sides from the centers of the lenses, respectively.

7. The front cowl for use with the saddle-ride vehicle according to claim 3, wherein lenses in front portions of the at least one headlight are formed wherein the lenses are located further rearwardly toward the sides from the centers of the lenses, respectively.

8. The front cowl for use with the saddle-ride vehicle according to claim 5, wherein a plurality of headlights are arranged side by side in a left-right direction and are placed inside the air introduction passage with a front end of the plurality of headlights, that is closer to an outside of the vehicle body in a vehicle widthwise direction, located further rearwardly than a front end of the plurality of headlights that are closer to the center of the vehicle body in the vehicle widthwise direction.

9. The front cowl for use with the saddle-ride vehicle according to claim 1, wherein the at least one headlight is placed further rearwardly than points wherein in a plan view straight lines extend in a front-rear direction while passing the centers of the at least one headlight in the widthwise direction intersect a front end of the duct.

10. The front cowl for use with the saddle-ride vehicle according to claim 2, wherein the at least one headlight is placed further rearwardly than points wherein in a plan view straight lines extend in a front-rear direction while passing the centers of the at least one headlight in the widthwise direction intersect a front end of the duct.

11. The front cowl for use with the saddle-ride vehicle according to claim 3, wherein the at least one headlight is placed further rearwardly than points wherein in a plan view straight lines extend in a front-rear direction while passing the centers of the at least one headlight in the widthwise direction intersect a front end of the duct.

12. The front cowl for use with the saddle-ride vehicle according to claim 1, wherein the at least one headlight is supported with the assistance of stays that are provided in a plurality of portions spaced out at intervals in a circumferential direction of the duct.

13. The front cowl for use with the saddle-ride vehicle according to claim 2, wherein the at least one headlight is supported with the assistance of stays that are provided in a plurality of portions spaced out at intervals in a circumferential direction of the duct.

14. The front cowl for use with the saddle-ride vehicle according to claim 1, wherein a single opening including at least a part placed in a center portion of the vehicle body in the vehicle widthwise direction, is provided at the front cowl constituting part of the vehicle body, and
   a front end of the single duct is arranged, facing the opening.

15. The front cowl for use with the saddle-ride vehicle according to claim 2, wherein a single opening including at least a part placed in a center portion of the vehicle body in the vehicle widthwise direction, is provided at the front cowl constituting part of the vehicle body, and
   a front end of the single duct is arranged, facing the opening.

16. A front cowl for use with a saddle-ride vehicle comprising:
   an air introduction passage formed in a front portion of front cowl, said air introduction passage being opened in a forward direction and being configured to introduce a flow of air rearwardly;
   a duct forming said air introduction passage, said duct including a front duct half body and a rear duct half body;
   a mesh member having a peripheral portion positioned between the front duct half body and the rear duct half body, said mesh member extending substantially orthogonally across a width direction of the duct;
   at least one support case being fixed to and penetrating the mesh member; and
   at least one headlight being operatively mounted within said at least one support case for selectively shinning a light in a forward direction;
   wherein the at least one headlight utilizes LEDs as the respective source of light, said at least one headlight being placed inside the air introduction passage while being positioned within the at least one support case.

17. The front cowl for use with the saddle-ride vehicle according to claim 16, wherein the at least one headlight is placed inside the air introduction passage wherein passage portions are formed in at least paired two opposite sides out of paired left and right sides and paired upper and lower sides of the at least one headlight within the duct, the passage portions being opened in a forward direction and constituting part of the air introduction passage; and
   a flow of air flowing through the passage portions flow together behind the at least one headlight.

18. The front cowl for use with the saddle-ride vehicle according to claim 16, wherein the duct is supported by the front cowl constituting part of the vehicle body.

* * * * *